United States Patent [19]

Perego

[11] Patent Number: 5,434,494
[45] Date of Patent: Jul. 18, 1995

[54] USE OF BATTERIES IN CHILDREN'S ELECTRIC VEHICLES

[75] Inventor: Gianluca Perego, Arcore, Italy

[73] Assignee: Peg Perego Pines S.p.A., Milan, Italy

[21] Appl. No.: 176,780

[22] Filed: Jan. 3, 1994

[30] Foreign Application Priority Data

Jan. 14, 1993 [IT] Italy .................................. MI93U0025

[51] Int. Cl.⁶ .............................................. H02J 7/00
[52] U.S. Cl. .............................................. 320/2; 429/96
[58] Field of Search ........................ 320/2, 5, 15, 48; 429/96, 97, 98, 99, 100

[56] References Cited

U.S. PATENT DOCUMENTS

| | | | |
|---|---|---|---|
| 4,035,709 | 7/1977 | Seider et al. | 320/23 |
| 4,160,857 | 7/1979 | Nardella et al. | 429/97 |
| 4,215,306 | 7/1980 | Mace | 320/2 |
| 4,308,492 | 12/1981 | Mori et al. | 320/32 |
| 4,371,827 | 2/1983 | Mullersman et al. | 320/48 |
| 4,439,719 | 3/1984 | Lambert et al. | 320/31 |
| 4,716,353 | 12/1987 | Engelmann | 320/21 |
| 4,983,903 | 1/1991 | Bae et al. | 320/2 |
| 5,061,579 | 10/1991 | Ishimoto | 429/96 |
| 5,187,423 | 2/1993 | Marton | 320/2 |
| 5,250,905 | 10/1993 | Kuo et al. | 320/48 X |

*Primary Examiner*—Kristine L. Peckman
*Attorney, Agent, or Firm*—McGlew and Tuttle

[57] ABSTRACT

A toy electric car (11) with an accessible compartment (10) which removably houses an accumulator battery, is provided with a battery box (13) having a gripping and removing handle (15). The battery box (13) receives electric accumulators (21, 22) connected towards the outside by a socket (19) on the body of the battery box (13) to supply electric power to the vehicle through a complementary plug (20) connected to the wiring system of the vehicle and insertable in the socket.

16 Claims, 2 Drawing Sheets

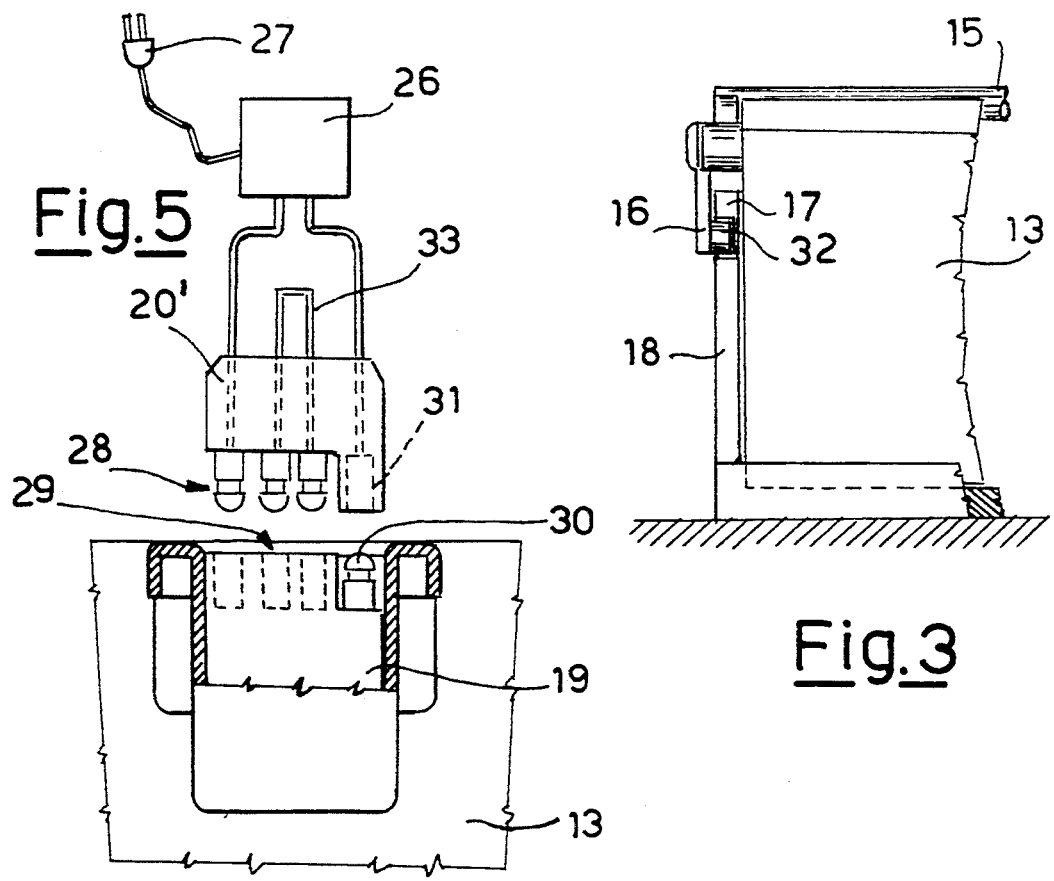
Fig. 5
Fig. 3
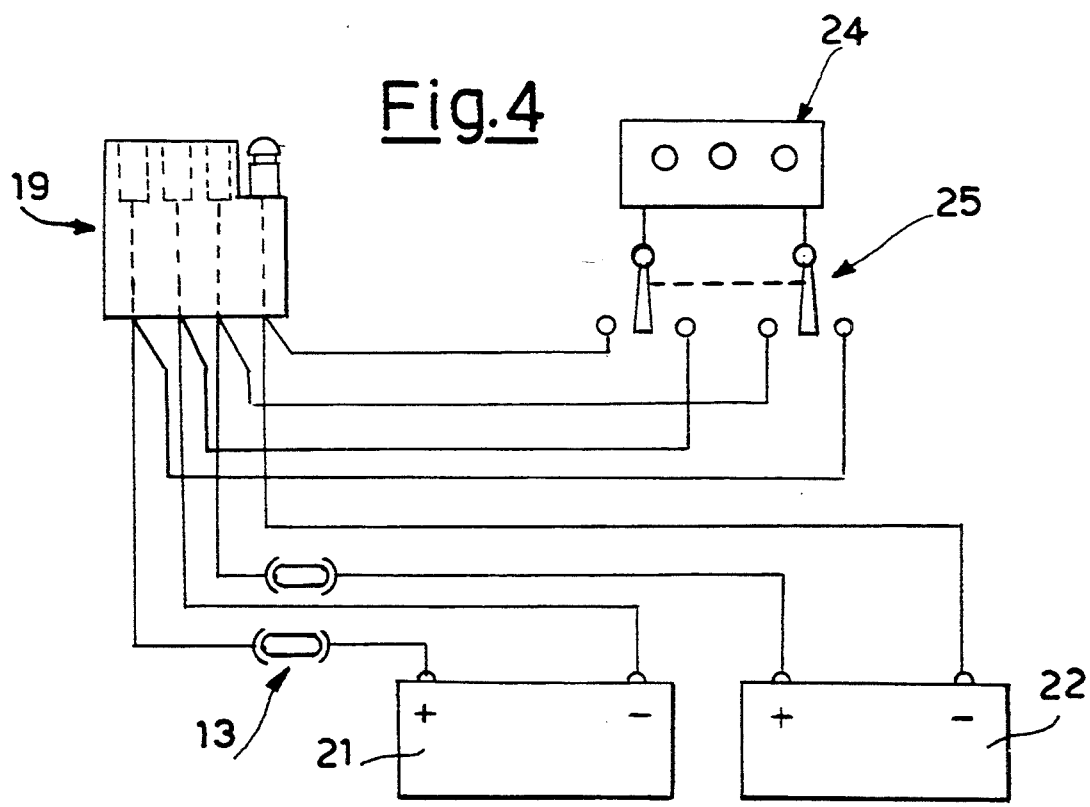
Fig. 4

USE OF BATTERIES IN CHILDREN'S ELECTRIC VEHICLES

BACKGROUND OF THE INVENTION

In children's electric vehicles, such as battery-operated toy motor cars and motor-scooters, the problem of immobilization of the toy, due to recharging, is well known.

As a rule, the batteries are firmly secured to the vehicle and are recharged by connecting a suitable recharging socket situated on the vehicle itself to a charger fed by the normal power network.

This involves the aforementioned immobilization of the toy even for prolonged periods of time, resulting in understandable inconvenience. A further problem of this known technique is related to the difficulty which may sometimes be encountered, in bringing the vehicle close to a power outlet, especially when the vehicle is relatively large.

The general scope of this invention is to obviate the aforementioned problems by providing a battery box for accumulators of toy motor vehicles which enables the batteries to be easily removed, recharged and re-inserted.

SUMMARY OF THE INVENTION

This scope is achieved, according to the invention, by providing, in an electric toy vehicle comprising an accessible compartment which removably houses an accumulator battery, a battery box provided with a gripping and removing handle, said battery box receiving electric accumulators connected towards the outside by means of a socket on the body of the battery box to supply electric power to the vehicle through a complementary plug connected to the wiring system of the vehicle and insertable in the socket.

BRIEF DESCRIPTION OF THE DRAWINGS

The innovatory principles of this invention and its advantages with respect to the known technique will be more clearly evident from the following description of a possible exemplificative and non restrictive embodiment applying such principles, with reference to the accompanying drawings, in which:

FIG. 3 shows a partial front view of the battery box of FIG. 1;

FIG. 4 shows a possible wiring diagram of the battery box of FIG. 1;

FIG. 5 shows a schematic cross-sectional view along the line III—III of FIG. 2.

DETAILED DESCRIPTION OF THE INVENTION

Figure 1:
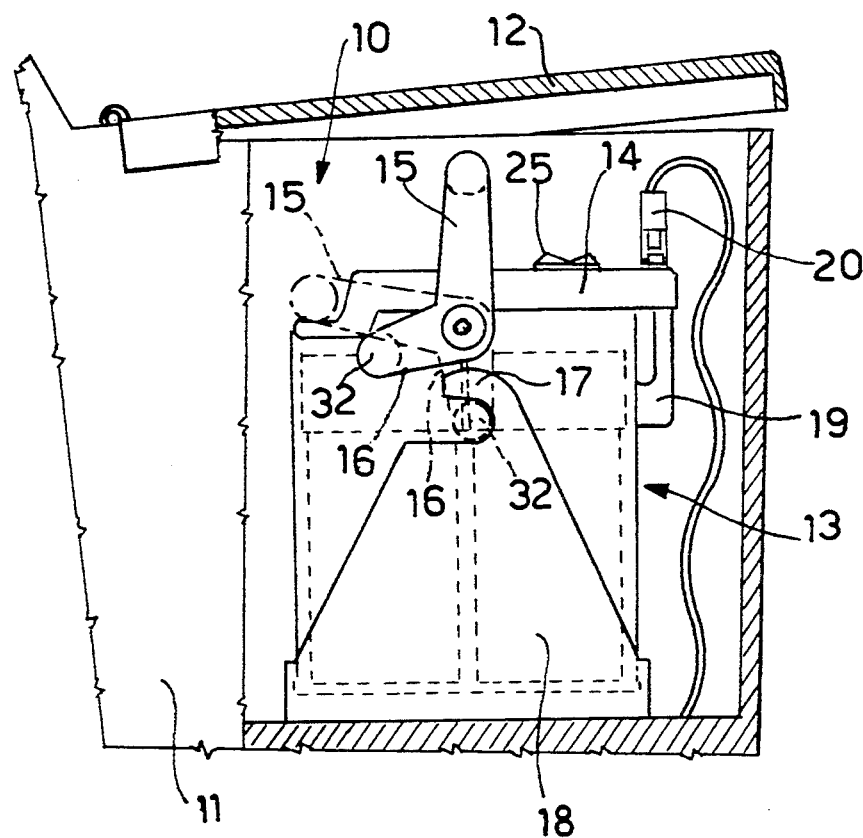
FIG. 1 shows a schematic partial cutaway side view of a part of a children's electric motor vehicle using a battery box according to the invention.

With reference to the figures, FIG. 1 schematically shows a compartment 10 made in a generic children's electric motor vehicle generically indicated by reference 11 and not further shown, since it can be of any known type and consequently easily imaginable by the expert in the field. The compartment, for example, is superiorly provided with an access cover or hood 12.

According to the invention, the compartment 10 can house a battery box 13 to contain the accumulators.

The battery box is superiorly closed by a cover 14 and is provided with a gripping handle 15.

Advantageously, as shown in FIG. 1, the handle 15 is shaped in the form of an upturned U, hinged along a horizontal axis to enable it to be moved from the gripping or lifting position (shown by the continuous line) to the lowered or inoperative position (shown by the "chain"). In the lowered position, the handle can be housed in an appropriately shaped recess in the cover 14. The handle has at least one protrusion 16, projecting from one of the supporting arms of the crosspiece of the handle, which couples with a corresponding hook 17 integral with the vehicle. For example, as can be clearly seen also in FIG. 3, (which shows only one end of the battery box, the other end advantageously being substantially specular), the compartment is provided with a bearing seat for the battery box, made in the form of a U-shaped element 18, with the base of the U receiving the bottom of the box and lateral arms disposed on either side of the box and each ending with a hook 17.

Thus, when the box is placed in the housing and the handle is lowered the box remains firmly secured in place thanks to the coupling between the fixed hook 17 and the pins or protrusions 32 projecting from the lever ends 16. To remove the box it is sufficient to lift the handle to release it by disengaging the protrusions 32 from the hook seats 17.

The box 13 comprises an integrated socket 19 which connects with the internal batteries. The socket for example can be disposed on the wider side of the box opposite the handle in a reclined position and facing upwards so as to have its coupling end substantially close to the upper surface of the cover 14.

As can be seen in FIG. 1, a complementary plug 20 connected to the known wiring system of the toy can be plugged into the socket 19.

Figure 2:
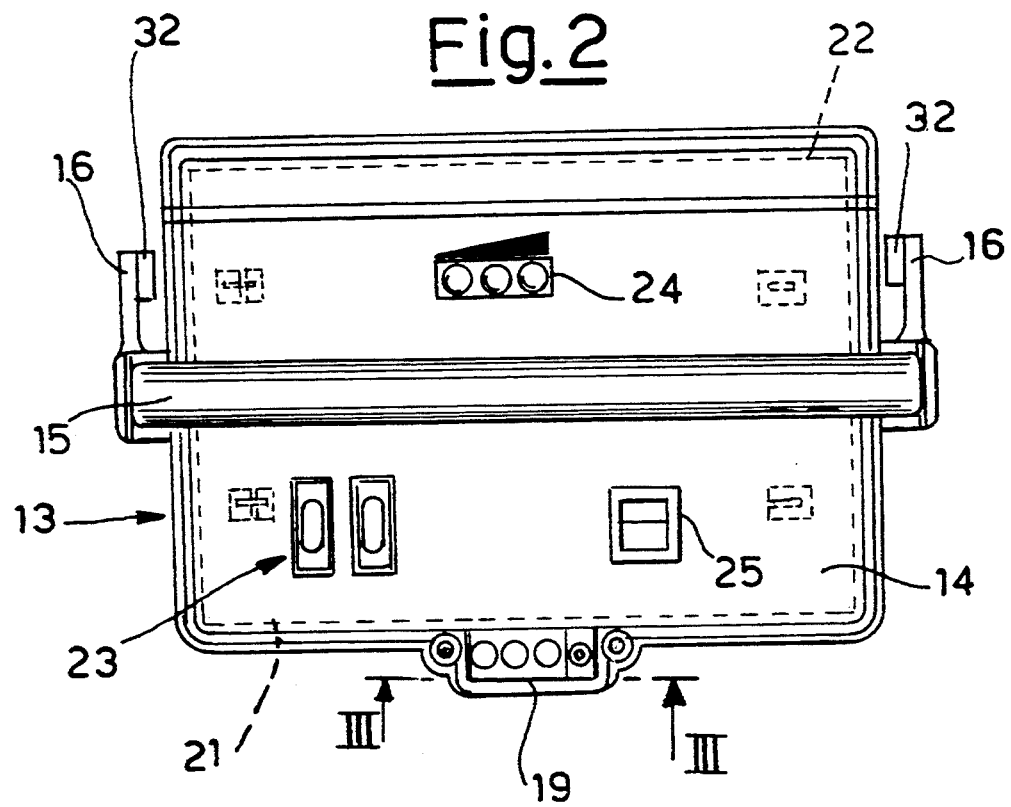
FIG. 2 shows a plan view of the battery box of FIG. 1.

FIG. 2 shows a top view of the box 13. The cover is fitted with fuse carriers 23 for protective fuses connected in series to the batteries. The cover can also advantageously be fitted with a testing button 25 connecting the batteries to a known device 24 provided with optical indicators disposed on the cover to display the state of charge. For example, the device 24 can comprise voltage comparators which alternately light up one of three LED diodes depending on whether the voltage of the batteries is above a pre-established value indicating a satisfactory state of charge (for example, around 100%), within a pre-established range indicating an intermediate state of charge (for example, around 50%) or below a pre-established minimum indicating that the batteries are completely flat. The pre-established values for the various states of charge obviously depend upon the type of accumulators used and are well known to the expert in the field.

A device of this kind is substantially of known technique and consequently easily imaginable by the expert in the field. For this reason, it will not be further shown or described herein.

Thanks to the device 24, it is possible to know to what degree the batteries are charged by simply pressing the testing button 25 and seeing which LED lights up.

FIG. 4 shows a possible example of a wiring diagram for the connections of the various elements contained in the box. As can be seen from this diagram, the accumulators can advantageously be two in number, indicated by references 21 and 22, independently connected, by means of corresponding fuses 13, to the contacts of the socket 19 which, for this purpose, has four poles. Since there are two separate voltages on the socket 19, it is possible to power the circuit of the toy motorcar with series voltage, parallel current or with two independent voltages of the accumulators, by simply changing the connections on the plug 20. For example, the change-over to and from series and parallel can be effected by a switch built into the gearchange of the toy motorcar (not shown) so as to provide a parallel connection during start up (which calls for high current and low voltage) and a series connection when running at high speed (which calls for a higher voltage and relatively lower current). As an indication, the batteries can each be 6 V batteries.

As can also be seen in FIG. 4, the testing button 25 is composed of a double-throw switch with stable central zero. For example, this button can be of the rocker type (as can be seen in FIGS. 1 and 2). The two movable or switching contacts of the button are connected to the testing circuit 24 while the fixed contacts are connected to the poles of the accumulator so that when the button is in the central or inoperative position, there is no connection between the testing circuit 24 and the batteries 21, 22. When the button is pressed towards one of the two operating positions, the testing circuit is connected to an accumulator through a set of contacts, whereas when the button is pressed towards the other operating position, the testing circuit is connected to the other accumulator through the other set of contacts. The button can be made to return to the central position, for example, by means of a spring as soon as the button is released. It is thus possible to check the state of charge of the accumulators whatever connection has been imposed on them by the external circuit connected to the plug 20. FIG. 5 shows an enlarged detail of the socket 19 and the complementary plug which can either be the plug 20 for connection to the system of the toy motor-car, or a similar plug 20' for connection to a battery charger 26 powered, for example, by the normal electric power network by means of a plug 27. Although the figure shows the plug 27 connected by a cable to the casing of the battery charger, it is obviously possible to use a battery charger of the type with a plug built into the casing.

Socket and plug must have a polarization key so as to permit only one direction of reciprocal insertion. As can be clearly seen in FIG. 5, for example the key can consist of the use of one or more contact pins 28 on the plug which fit into corresponding contact bushings 29 in the socket, and a pin 30 asymmetrically disposed on the socket which plugs into a corresponding bushing 31 in the plug. Other polarization keys can be easily imagined by the expert.

For recharging, the recharging plug 20' comprises a jumper 33, so as to connect the batteries in series to the battery charger.

At this point it will be clear that the intended scopes have been achieved by providing a battery box which enables the prompt removal and replacement of batteries in toy motor vehicles and by providing a further feature whereby the batteries can be firmly and easily locked in place and their state of charge can be easily checked, both when they are fitted in place in the vehicle, and when they are removed or being recharged. It is obviously possible, by using two boxes of the above-described type, to ensure the continuous operation of the toy motorcar by recharging one box while the other is in use in the vehicle.

The foregoing description of an embodiment applying the innovatory principles of this invention is obviously given merely by way of example in order to illustrate such innovatory principles and should not therefore be understood as a limitation to the sphere of the invention claimed herein.

For example, the exact proportions of the battery box will depend upon the number, type and capacity of the batteries contained therein.

Whenever it is necessary to supply the external circuits with several separate voltages, several accumulators can be provided and the socket and plug will consequently be provided with a larger number of contacts, as will be obvious to the expert in the field. The testing button will be made with two positions in order to alternately connect and control the various accumulators.

Conversely, whenever only one voltage is required, the socket and plug can be provided with just two contacts and, for example, the accumulators can be connected in series inside the box or be replaced by a suitable single accumulator. In this case, the testing button will connect the testing circuit to the series or to the single accumulator.

What is claimed is:

1. A toy electric vehicle, comprising:
   an accessible accumulator battery compartment;
   a battery box including a gripping and removing handle;
   electric accumulators disposed in said battery box, a socket provided on a body portion of said battery box, said socket for supplying electric power to said electric vehicle;
   a complimentary plug connected to a wiring system of said vehicle, said complimentary plug being insertable into said socket;
   said handle being moveable from a gripping position to a folded inoperative position, said handle including a coupling protrusion;
   a protrusion seat positioned in said compartment, said coupling protrusion fitting into said protrusion seat when said handle is moved to said inoperative position whereby said coupling protrusion and said protrusion seat cooperate to prevent said battery from being extracted from said compartment, in said handle inoperative position.

2. A vehicle according to claim 1, wherein said handle is shaped in a form of an upside down U with arms having ends hingedly connected along a horizontal axis whereby said handle is rotated between said inoperative position and said gripping position, said coupling protrusion projecting from one arm of said upside down U.

3. A vehicle according to claim 1, wherein said compartment includes a U-shaped bearing seat including a base receiving a bottom of said battery box and including lateral arms disposed on either side of said battery box, each of said lateral arms ending in a hook, each hook defining one side of said protrusion seat.

4. A vehicle according to claim 1, further comprising display means for displaying a charged state of said accumulators.

5. A vehicle according to claim 1, wherein said accumulators are connected to said socket by means of at least one protective fuse.

6. A vehicle according to claim 1, further comprising a cover for closing said compartment.

7. A vehicle according to claim 1, further comprising an alternative plug, connectable to said socket, for connecting a battery charger to said accumulators.

8. A vehicle according to claim 1, wherein said accumulators comprise a first and second accumulator, each of said first and second accumulator being independently connected to said socket.

9. A vehicle according to claim 7, wherein said plug comprises a connection for connecting said accumulators in series with said battery charger.

10. A vehicle according to claim 8, wherein said plug comprises a connection for connecting said first accumulator and said second accumulator in series with a battery charger.

11. A toy electric vehicle, comprising:
an accessible accumulator battery compartment;
a battery box including a gripping and removing handle;
electric accumulators disposed in said battery box, socket provided on a body portion of said battery box, said socket for supplying electric power to said electric vehicle;
a complimentary plug connected to a wiring system of said vehicle, said complimentary plug being insertable into said socket;
display means for displaying a charged state of said accumulators;
a testing button connected between said display means and said accumulators for activating said display means, said testing button including two sets of contacts alternately operable to connect either a first accumulator or a second accumulator of said accumulators, to said display device.

12. A battery box according to claim 11, wherein said testing button includes two operating positions with a stable central zero position, each of said operating positions corresponding to the operation of one of said two sets of contacts.

13. A vehicle according to claim 11, wherein said display means comprises three LED elements which each light up alternately, depending on whether a voltage of said accumulators is:
above a pre-established value, indicating a satisfactory state of charge;
within a pre-established range indicating an intermediate state of charge; or
below a pre-established minimum indicating that said accumulators are substantially not charged.

14. A vehicle according to either claim 13 or 11, wherein said display means is provided on an upper surface of said battery box.

15. A vehicle according to either claim 14 or 11, wherein said testing button is provided on an upper surface of said battery box.

16. A vehicle according to claim 5, wherein said protective fuse is provided on an upper surface of said battery box.

* * * * *